United States Patent [19]
Moulton

[11] Patent Number: 5,281,971
[45] Date of Patent: Jan. 25, 1994

[54] RADAR TECHNIQUES FOR DETECTION OF PARTICULAR TARGETS

[75] Inventor: Stephen W. Moulton, Minnetonka, Minn.

[73] Assignee: Ceridian Corporation, Minneapolis, Minn.

[21] Appl. No.: 776,802

[22] Filed: Feb. 28, 1977

[51] Int. Cl.$^5$ .......................... G01S 7/42; G01S 13/90
[52] U.S. Cl. ......................................... 342/13; 342/25
[58] Field of Search ............ 343/5 CM, 18 E; 342/13, 342/25

[56] References Cited

U.S. PATENT DOCUMENTS 3,259,883 7/1966 Rabinow et al. .
3,432,674 3/1969 Hobrough .

OTHER PUBLICATIONS

J. Rabinow, "The Present State of the Art of Reading Machines", *Pattern Recognition*, edited by L. N. Kanal, Proceedings of IEEE Workshop on Pattern Recognition, Puerto Rico, Oct. 24-26, 1966, pub. 1968, Thompson Book Company, pp. 15-19.
R. B. Hennis, "Recognition of Unnurtured Characters in a Multifont Application", *Pattern Recognition*, edited by L. N. Kanal, Proceedings of IEEE Workshop on Pattern Recognition, Puerto Rico, Oct. 24-26, 1966, pub. 1968, Thompson Book Company, pp. 85, 86.
Control Data Corporation, "A Proposal for a Concealed Target Detection System" to U.S. Air Force Avionics Laboratory, Nov. 1973, pp. 3-50 to 3-53.
J. C. Kirk, Jr., "A Discussion of Digital Processing in a Synthetic Aperture Radar", IEEE Transactions on Aerospace and Electronics Systems, vol. AES-11, No. 3, May 1975, pp. 326-337.
J. C. Kirk, Jr., "Motion Compensation for Synthetic Aperture Radar", IEEE Transactions on Aerospace and Electronic Systems, vol. AES-11, No. 3, May 1975, pp. 338-348.
S. Winograd, "On Computing the Discrete Fourier Transform", Proceedings of the National Academy of Science, vol. 73, No. 4, Apr. 1976, pp. 1005-1006.

*Primary Examiner*—T. H. Tubbesing
*Attorney, Agent, or Firm*—Kinney & Lange

[57] ABSTRACT

A radar system is capable of detecting and classifying rotating targets such as rotating antennas. Particularly, unfriendly radar installations can be detected and classified by a synthetic aperture radar system, which may be carried by an aircraft.

The radar reflection signal (echo) received by a synthetic aperture radar system and reflected from a rotating object will appear as a series of image points, or pulses, at the same range, but spaced apart by some apparent distance or frequency. By knowing the apparent distance (d) between adjacent image points, the range (R) to the target, the time of integration ($T_o$) of the radar system, the velocity ($V_o$) of the detecting aircraft, the angle ($B_o$) to the target, and the wavelength of the aircraft's radar signal ($\lambda$), the rate of rotation (F) of the target may be determined from $$F = \frac{d}{ST_o}$$

where S is the azimuthal resolution expressed by $$S = \frac{R\lambda}{2V_o T_o \sin B_o}.$$

Furthermore, by knowing the azimuthal extent (W) of the apparent target (namely, the apparent width of the entire set of image points), the width or diameter (L) of the target may be ascertained $$L \approx \frac{WV_o \sin B_o}{4RF}.$$

Apparatus for classifying rotating targets is provided to permit on-board determination of the class of target detected.

10 Claims, 2 Drawing Sheets

RADAR TECHNIQUES FOR DETECTION OF PARTICULAR TARGETS

This invention relates to detection of radar installations, and particularly to the detection, classification and position determining of rotating radar antennas, whether radiating or not. The invention is particularly applicable to the locating of unfriendly surface-to-air missile (SAM) sites which include radar installations for detecting aircraft.

Heretofore, SAM radar installations have been detected by monitoring the frequency of probable radar radiation to determine the location of unfriendly radar installations detecting friendly aircraft. However, it is known that certain SAM sites are mobile and include several radar antennas, most of which are maintained in a "standby" mode for long periods of time. When a particular radar antenna is activated, a radar signal is propagated for a relatively short period of time and is thereafter moved. When in the "standby" mode, however, the antenna dish is rotated but the radar transmitter feeds only a dummy load. The present invention is concerned with radar apparatus and techniques to detect, classify and locate radar antennas in both the "active", as well as the "standby" mode, that is, those unfriendly radar antennas which are rotating but may or may not be propagating a radar signal.

It has been determined that rotating ground-based structures provide long wavelength synthetic-aperture radar patterns identical to that reflected from several (three or more) equally spaced ground echoers. Mathematically, the pattern of the apparent multiple targets is the Fourier transform of the complex envelope time modulation introduced by the rotator. Thus, the phase and amplitude pattern of apparent multiple targets provides a specific recognizable signature which is characteristic of the class of the rotating object.

It is an object of the present invention to provide techniques for detecting and classifying rotating targets.

It is another object of the present invention to provide methods and apparatus for detection and classification of unfriendly radar antennas.

It is yet another object of the present invention to provide airborne radar apparatus and techniques for detection and classification of unfriendly rotating radar antennas whether or not the unfriendly radar installations are propagating radar signals.

In accordance with the present invention, a long wavelength synthetic aperture radar system aboard a friendly aircraft propagates a long wavelength signal toward an area suspected of containing unfriendly rotating radar antennas. The aircraft radar system will receive multiple apparent targets upon detection of a rotating object (such as an unfriendly radar antenna), the multiple apparent targets each being at exactly the same range relative to the aircraft and spaced in azimuth by an amount related to the range, rotation rate of the target and radar wavelength of the airborne radar system.

One feature of the present invention resides in the provision of apparatus, including masking apparatus, to compare radar echoes against known echo patterns ordinarily received from particular rotating targets, to classify suspected targets.

Another feature of the present invention resides in the provision of techniques to determine the size and rotation rate of rotating targets.

The above and other features of this invention will be more fully understood from the following detailed description and the accompanying drawings, in which.

Figure 1:
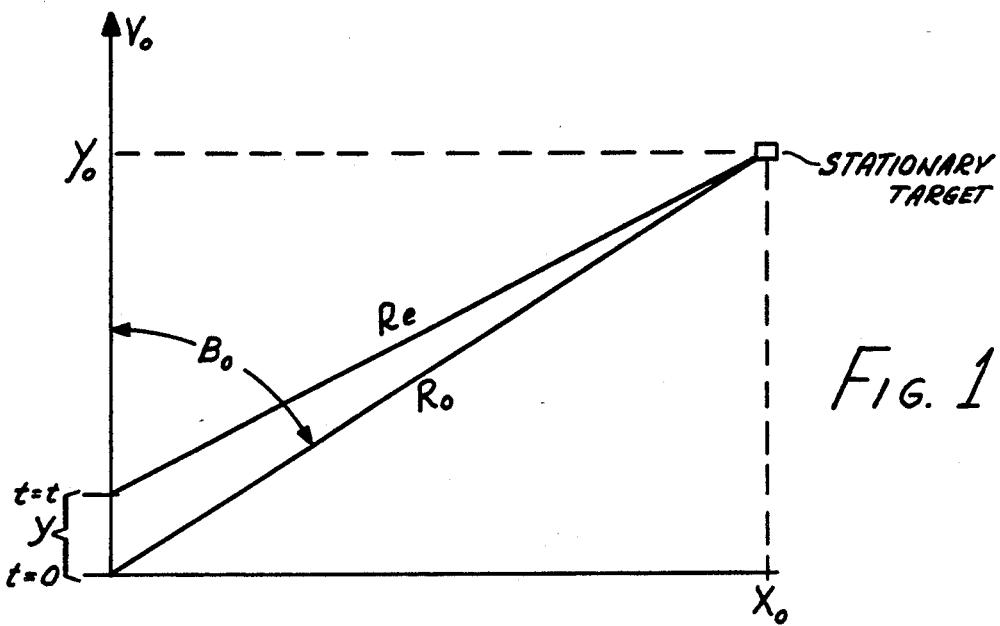
FIG. 1 is a plan view of a typical radar problem.

With reference to FIG. 1, which illustrates the conditions of a radar reflection from a stationary target, the radar echo will be a function of time, f(t):

$$f(t) = R_e \left[ A \epsilon^{j(\omega_o t + \frac{4\pi}{\lambda} R(t))} \right], \tag{1}$$

where A is a constant equal to $a\epsilon^{jE}$, $\omega_o$ is the radar carrier frequency in rad/sec, $R(t)$ is the instantaneous range to the target, and $\lambda$ is the radar wavelength. (Re being the real component of the complex equation, as opposed to the imaginary component.) However, the range, $R(t)$, when the echo is received at time $t=t$ will be $$R(t) = \sqrt{X_o^2 + (Y_o - Y)^2}, \text{ and} \tag{2}$$

$$Y = V_o t, \tag{3}$$

where $V_o$ is the velocity of the aircraft. Therefore, for a small t $$R(t) \approx R_o + \frac{Y_o V_o t}{R_o} + \frac{V_o^2 t^2}{2R_o}, \tag{4}$$

which in turn equals $$R_o + V_o \cos B_o t + \frac{V_o^2 t^2}{2R_o}, \tag{5}$$

$$R_o = \sqrt{X_o^2 + Y_o^2}. \tag{6}$$

Thus, the radar echo from a fixed target is $$f(t) = R_e \left\{ A \epsilon^{j(\omega_o + \frac{4\pi}{\lambda} V_o \cos B_o)t + (\frac{2\pi V_o^2}{R\lambda})t^2 + (\frac{4\pi R_o}{\lambda} + E))} \right\}. \tag{7}$$

The first term of the exponent of equation (7) shows that the radar echo is shifted in frequency by an amount equal to $4\pi V_o/\lambda \cos B_o$ (in radians/sec) at $t=0$. The second term of the exponent indicates that the phase is varying parabolically with time and the third term of the exponent is an inconsequential phase constant.

In the case of a rotating target, such as a constantly rotating radar antenna dish, the constant A is a periodic function of time with a periodicity equal to that of the antenna rotation and can be represented by its Fourier series $$A(t) = \sum_{n=-m}^{n=+m} A_n e^{jn\sigma t}, \quad (8)$$

where $\sigma$ is the rotation rate of the rotating object and is equal to $2\pi F$, where F is the rotation rate in revolutions per second. For a simple sinusoidal modulation, $$\begin{aligned} A(t) &= a_o + a_1 \cos(\sigma t + \phi) \\ &= \frac{a_1}{2} \epsilon^{-j(\sigma t + \phi)} + a_o + \frac{a_1}{2} \epsilon^{+j(\sigma t + \phi)}. \end{aligned} \quad (9)$$

The substitution of equation (9) into equation (7) yields three terms:

$$f(t) = Re \left\{ \begin{array}{l} \frac{a_1}{2} \epsilon^{j[(\omega_o + \frac{4\pi}{\lambda} V_o \cos B_o - \sigma)t + (\frac{2\pi V_o^2}{R\lambda})t^2 + (\frac{4\pi R_o}{\lambda} + E - \phi)]} + \\ a_o \epsilon^{j[(\omega_o + \frac{4\pi}{\lambda} V_o \cos B_o)t + (\frac{2\pi V_o^2}{R\lambda})t^2 + (\frac{4\pi R_o}{\lambda} + E)]} + \\ a_1 \epsilon^{j[(\omega_o + \frac{4\pi}{\lambda} V_o \cos B_o + \sigma)t + (\frac{2\pi V_o^2}{R\lambda})t^2 + (\frac{4\pi R_o}{\lambda} + E + \phi)]} \end{array} \right\} \quad (10)$$

The three principal terms of equation (10) are identical in their exponents except for the component varying linearly with time and except for the phase parameter, $\phi$. A comparison of the second term of equation (10) with equation (9) shows it has exactly the same form as the echo from a fixed object at angle $B_o$. The first term has exactly the same form as the echo from a fixed object at angle $B_{-1}$, where $B_{-1} = B_o - \Delta B$ and the last term has exactly the same form as the echo from a fixed object at angle $B_{+1}$ where $B_{+1} = B_o + \Delta B$.

Figure 2:
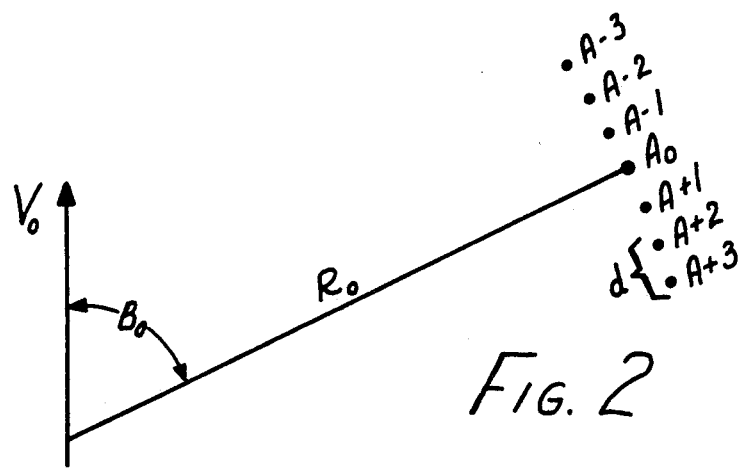
FIG. 2 is a plan view of a radar problem presenting multiple apparent image points from a rotating target, in accordance with the present invention.

Therefore, for the simple modulation function, the rotation of the object splits the echo into three signals, one identical to the echo at angle $B_o$ and one each identical to echos from angles $B_o - \Delta B$ and $B_o + \Delta B$. Therefore, the rotating target, such as a rotating radar antenna dish, appears in the synthetic aperture image as three targets, all in the same range but separated in azimuth by $$d = R_o \Delta B = \frac{R_o \lambda \sigma}{4\pi V_o \sin B_o} = \frac{R_o \lambda F}{2 V_o \sin B_o}, \quad (11)$$

where d is the spacing between apparent multiple targets, $R_o$ is the radar range, F is the rotational rate of the target (in revolutions/sec.), $V_o$ is the aircraft velocity, $B_o$ is the angle to ground track (see FIG. 2), and $\lambda$ is the wavelength of the radar carried by the aircraft. Thus, knowing the spacing (d) between apparent multiple targets, the rotational rate F of the target radar antenna can be determined.

If the aircraft's radar integrates coherently for time $T_o$, the azimuthal resolution will be $$S = \frac{R\lambda}{2 V_o T_o \sin B_o}, \quad (12)$$

which, when divided into equation (11) yields $$d/S = FT_o. \quad (13)$$

Therefore, the spacing d must be greater than the azimuthal resolution.

It can be shown that the azimuthal extent W, of the multiple apparent targets is $$W \approx \frac{4RLF}{V_o \sin B_o}. \quad (14)$$

where $L > \lambda/2$ and is the width of the rotating object, or more specifically, the diameter of the rotating antenna dish being detected. From equation 14 the width of the object can be detected as $$L \approx \frac{WV_o \sin B_o}{4RF}. \quad (15)$$

Further, from equations 12, 13 and 15, $L \approx W\lambda/8d$.

Figure 3:
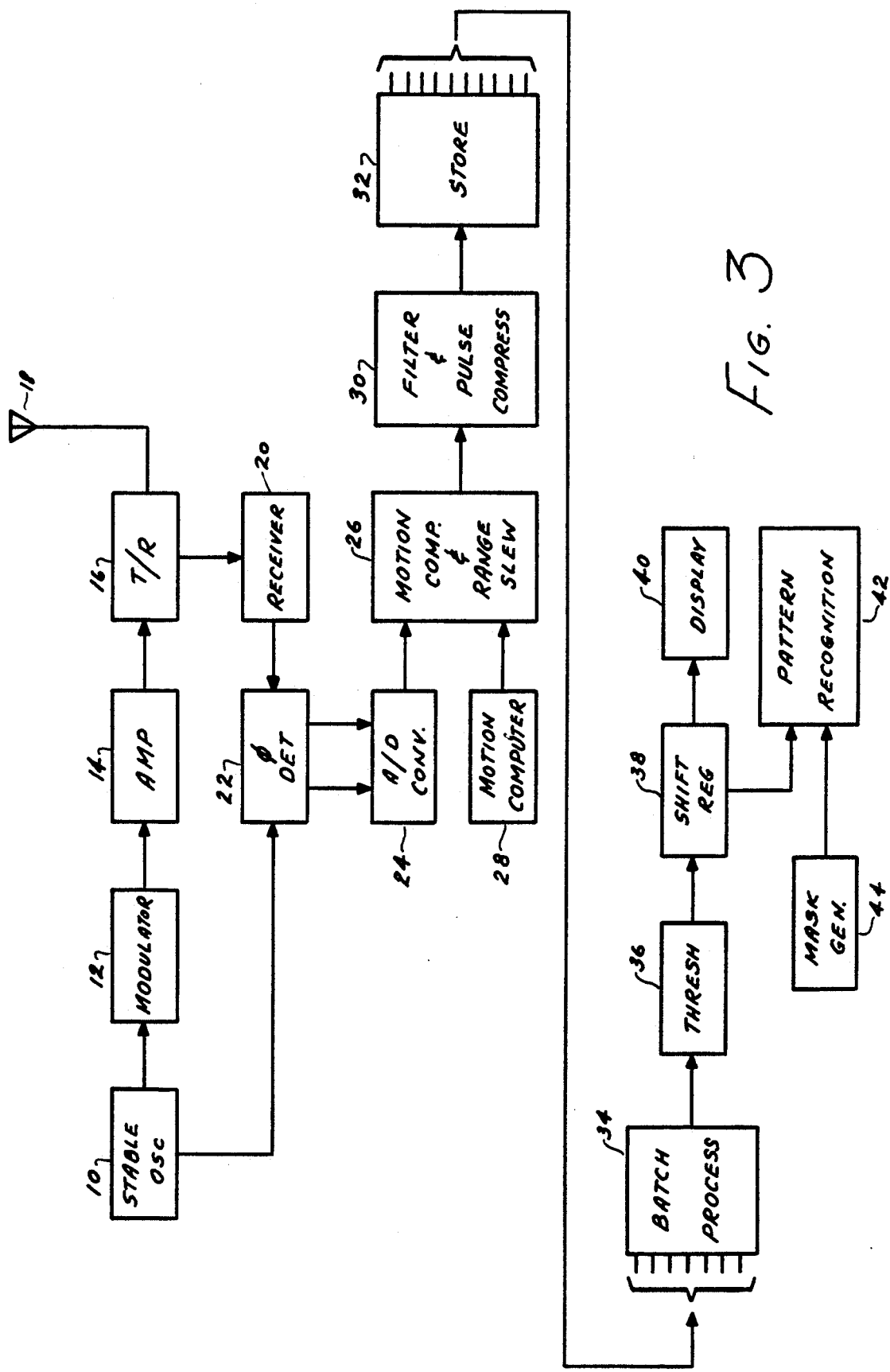
FIG. 3 is a block circuit diagram of apparatus according to the presently preferred embodiment of the present invention for detection and classification of rotating targets.

FIG. 3 illustrates the apparatus capable of recognizing and classifying rotating targets. As shown in FIG. 3, stable oscillator 10 supplies an oscillating radar signal to modulator 12, the signal being amplified by amplifier 14 to operate transmitter/receiver 16 to drive antenna 18 to propogate a suitable radar signal. Reflections from suspected targets are received by antenna 18 to operate transceiver 16 to drive receiver 20 which supplies an output to phase detector 22. Phase detector 22 also receives the original signal from stable oscillator 10. The signal processed by phase detector 22 is a vector signal having phase (I) and quadrature (Q) components which in turn are forwarded to analog-to-digital converter 24 for conversion to digital data for forwarding to motion and range compensator 26. Motion sensing computer 28, on board the detecting aircraft, supplies digital data as to change in position of the aircraft, so that motion and range compensator corrects for the motion changes of the aircraft as well as for changes in range slew. The output of compensator 26 is forwarded to filter and pulse compressor 30 for input to data storage memory 32.

The apparatus thus far described is quite similar to a typical synthetic aperture radar system. The present invention contemplates the addition of a batch processor 34 connected to the memory 32 to obtain and process data concerning the apparent reflections received by the radar system. The processing order is such that data representing the echoes from adjacent azimuth cells all at the same range flow sequentially. Threshold detector 36 selects those reflections greater than a predetermined amount for input to shift register 38. The output of shift register 38 may be supplied to the input of display device 40 (which may be a cathode ray tube display screen, map display or other suitable device) and/or to pattern recognition circuit 42 which in turn receives input also from mask generator 44 for purposes to be hereinafter explained.

Figure 4:
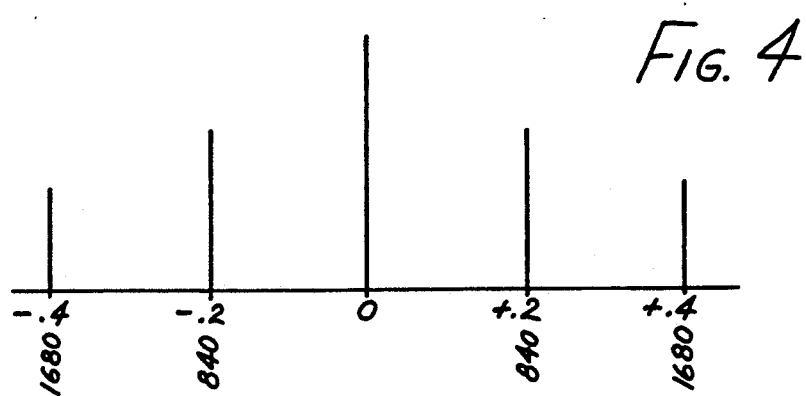
FIG. 4 is a diagram illustrating a typical echo pattern received from a rotating target using the present invention.

For purposes of explanation, let it be assumed that the aircraft carrying the apparatus illustrated in FIG. 3 is traveling at a velocity ($V_o$) of 600 feet per second, that the radar detects a suspected target at an angle ($B_o$) of 30° at a range (R) of 60 nautical miles, and the aircraft radar frequency is 140 MHz (or a wavelength, $\lambda$, of 7 feet). Let it further be assumed that the data will be integrated over a time span ($T_o$) of 20 seconds. The rotating target, whose size and rate of rotation is currently unknown, causes the on-board radar system to detect and process reflections, which, when processed, will appear in shift register 38 (and hence on display 40) as a series of image points, such as shown in FIG. 4. Obviously, a map display or other suitable device may be used to display pulse positions. As shown in FIG. 4, the image points are spaced approximately 0.2 MHz apart, which when converted to apparent distance, appears like several image points each spaced 840 feet apart (d). From the foregoing, the azimuthal resolution of the target can be determined from equation 12 as 210 feet. From equation 13, F, the rate of rotation can be determined as 0.2 Hz or about 12 revolutions per minute.

Since the azimuthal extent (the overall width of the pattern) is known from FIG. 4 as 3360 feet, using equation 15 the apparent diameter of the rotating object can be ascertained as approximately 3.5 feet.

Thus, for the given example, the aircraft radar system has detected a rotating antenna located 60 nautical miles from the aircraft at an angle of 30° from the aircraft, with a diameter of 3.5 feet and rotating at about 12 revolutions per minute.

Since it is most likely that the particular characteristics of the suspected target rotating antennas are known, and since it is most likely that the number of different types of antenna targets will be relatively small, the characteristic data of each type of known suspected target antenna may be preprogrammed into mask generator 44 for comparison by pattern recognition circuit 42. Thus, if the data stored in shift register 38 corresponds closely with the data stored in mask generator 44 for a particular target antenna, pattern recognition circuit 42 will classify the target. Otherwise, circuit 42 may calculate the rotational speed and size of the target antenna.

The number of apparent image points received from a rotating target will depend in part on the complexities of the geometry of such target, as well as its size. For example, in cases where the back side of the target is different from its front, the echo signals produced may include significant harmonic signals. Therefore, in most cases more than three apparent echoes will be received from rotating targets.

While the present invention has been described in connection with use on aircraft, it is understood that any convenient vehicle may be used, and it is to be understood that the data processing, or any part of it may be accomplished on board the vehicle or on the ground, or both. Also, while the present invention is also applicable for ground installations, it should be recognized to those skilled in the art that the apparent targets will be equally spaced in the same apparent doppler, rather than azimuth. Therefore, where used herein in relationship to apparent targets, the term "equally spaced" encompasses equal spacing in apparent azimuth as well as in apparent doppler. Also, while a display device 40 has been described, it is understood that any suitable recorder may be used in lieu of or in addition to the display, and transmitter means may be included to transmit the information gathered to a base station.

This invention is not to be limited by the embodiment shown in the drawings and described in the description, which is given by way of example and not of limitation, ut only by the scope of the appended claims.

What is claimed is:

1. Apparatus for detecting rotating targets comprising, in combination: radar means for propagating a radar signal toward an area suspected to contain a rotating target; receiver means for receiving radar echoes from said area; processor means connected to said receiver means for generating representations of radar echoes received from a plurality of apparent targets which are approximately equally spaced at approximately the same range; and means connected to said processor means and responsive to said representations for determining selected physical characteristics of the target.

2. Apparatus according to claim 1 wherein said radar means and said receiver means comprise a synthetic aperture radar system.

3. Apparatus according to claim 2 wherein said radar system is located on a moving vehicle.

4. Apparatus according to claim 3 wherein said last-named means includes mask generator means for generating mask patterns corresponding to representations of radar echoes expected to be generated by said processor means upon receipt of radar echoes from known types of targets, and pattern recognition means for comparing the mask patterns from said mask generator means with the representations generated by said processor means.

5. The method of determining characteristics of a rotating target comprising the steps of propagating a radar signal into an area suspected of containing said target, receiving radar echoes from apparent targets in said area, selecting radar echoes from a plurality of apparent targets which are approximately equally spaced at approximately the same range, and analyzing the selected radar echoes to determine selected characteristics of said rotating target.

6. The method according to claim 5 wherein the radar signal is propagated from and radar echoes received at a vehicle moving at a velocity $V_o$, and the rotational rate of the rotating target is determined from the relationship $$F = \frac{2V_o d \sin B_o}{R\lambda}$$

where d is the spacing between adjacent apparent targets, $B_o$ is the angle between the direction of travel of the vehicle and the line-of-sight to the target, R is the range to the target and $\lambda$ is the wavelength of the radar signal.

7. The method according to claim 6 wherein the width of the rotating target is determined from the relationship $$L \approx \frac{WV_o \sin B_o}{4RF}$$

where W is the azimuthal extent of the plurality of apparent targets.

8. The method according to claim 6 wherein the width of the rotating target is determined from the relationship $$L \approx W\lambda/8d,$$

where W is the azimuthal extent of the plurality of apparent targets.

9. The method according to claim 5 wherein the width of the rotating target is determined from the relationship $$L \approx W\lambda/8d,$$

where W is the azimuthal extent of the plurality of apparent targets, $\lambda$ is the wavelength of the radar signal and d is the spacing between adjacent apparent targets.

10. The method according to claim 5 further including generating patterns corresponding to radar echo patters expected to be received from known types of rotating targets, and comparing the selected radar echoes with the patterns generated to determine if the selected radar echoes correspond to the expected echo pattern from a known target.

* * * * *

UNITED STATES PATENT AND TRADEMARK OFFICE
CERTIFICATE OF CORRECTION

PATENT NO. : 5,281,971

DATED : January 25, 1994

INVENTOR(S) : STEPHEN W. MOULTON

It is certified that error appears in the above-identified patent and that said Letters Patent is hereby corrected as shown below:

Col. 8, line 6, delete "patters", should read --patterns--

Signed and Sealed this

Fourteenth Day of June, 1994

Attest:

BRUCE LEHMAN

*Attesting Officer*     *Commissioner of Patents and Trademarks*